US006201906B1

(12) United States Patent
Kich et al.

(10) Patent No.: US 6,201,906 B1
(45) Date of Patent: Mar. 13, 2001

(54) COMPACT WAVEGUIDE "T" SWITCH

(75) Inventors: Rolf Kich, Redondo Beach; Michael N. Ando, Torrance, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/262,999

(22) Filed: Mar. 5, 1999

(51) Int. Cl.[7] .................................. G02B 6/26; H01P 1/10

(52) U.S. Cl. .................................. 385/22; 385/15; 385/16; 385/24; 385/25; 385/44; 333/103; 333/106

(58) Field of Search .................................. 385/15, 16, 20, 385/21, 22, 23, 24, 25, 26, 44, 45; 333/105, 106

(56) References Cited

U.S. PATENT DOCUMENTS

| | | | | |
|---|---|---|---|---|
| 4,201,963 | * | 5/1980 | Welti | 333/106 |
| 4,312,561 | * | 1/1982 | Mead | 385/22 |
| 5,434,936 | * | 7/1995 | Nagaoka et al. | 385/22 |
| 5,463,704 | * | 10/1995 | Ziebol | 385/22 |
| 5,629,993 | * | 5/1997 | Smiley | 385/22 |
| 5,633,963 | * | 5/1997 | Rickenbach et al. | 385/25 |
| 5,699,463 | * | 12/1997 | Yang et al. | 385/22 |
| 6,128,426 | * | 10/2000 | Einhorn | 385/25 |

* cited by examiner

*Primary Examiner*—Brian Healy
(74) *Attorney, Agent, or Firm*—T. Gudmestad

(57) ABSTRACT

A compact "T" switch for use in a waveguide communication system switch includes a housing, a rotor, and a motor. The housing includes a pair of ends and an interconnecting sidewall enclosing a cylindrical cavity. One of the housing ends including an entry port, and the sidewall includes a plurality circumferentially spaced exit ports. The rotor is rotatably disposed within the housing cylindrical cavity, and includes an input end having an input port aligned with the housing entry port and an outer surface having a plurality of output ports for alignment with the housing exit ports. The rotor includes a primary or first passage connecting the input port to one of the output ports and further includes at least one secondary passages connecting a pair of the output ports. A motor is provided for rotating the rotor within the cavity for aligning each of the output ports with an adjacent one of the exit ports, thereby permitting the first passage to be connected to a selected one of the exit ports, and further permitting the secondary passage to interconnect a pair of the remaining exit ports.

37 Claims, 10 Drawing Sheets

COMPACT WAVEGUIDE "T" SWITCH

FIELD OF THE INVENTION

The present invention relates generally to switches for use in waveguide communication systems. More specifically, the present invention relates to a rotatable "T" switch providing at least one primary waveguide path and at least one secondary or cross-connect waveguide path.

BACKGROUND OF THE INVENTION

Waveguide communication systems typically include a number of channels or paths in order to provide system redundancy, thereby enhancing system reliability by permitting redundant systems to be switched in for systems that have failed. In order to facilitate switching between alternate channels, a waveguide switch must be included in the communication system. Presently, waveguide communication systems commonly employ an "R" switch architecture, which does not permit the connection of alternate ports or paths around the primary path configuration. In other words, the orientation of the "R" switch interrupts communication along alternate channels, so that communication is possible only through the chosen primary path linked by the "R" switch orientation. This limitation has given rise to the "T" switch concept.

A "T" switch permits the linking of alternate cross-connect channels around the primary waveguide path, an option that is not possible with existing "R" switch architecture. One such "T" switch is disclosed in U.S. Pat. No. 4,201,963. Unfortunately, prior art "T" switches typically employ existing "R" switch architecture, and therefore must employ an additional external waveguide. Consequently, prior art "T" switch configurations are excessively heavy and bulky, rendering them undesirable for use on spacecraft waveguide communication systems. Accordingly, there exists a need for a more compact and reliable "T" switch architecture.

SUMMARY OF THE INVENTION

A compact waveguide "T" switch according to the present invention provides a four port, three position waveguide switch, yet maintains a size and volume comparable to existing "R" switches. A distinct advantage of the present invention over prior art switching architecture is that the traveling wave tube amplifier (TWTA) can be switched into any channel along the chain without disrupting the operation of any other channel. The three position, four port design permits connection between the alternate waveguides regardless of the position of the primary path. The addition of a double ridge transformer and/or an inductive iris window allows a fixed waveguide to be connected in three states: 1) both waveguides aligned; 2) one waveguide rotated 60° while maintaining a good voltage standing wave ratio (VSWR); and 3) one waveguide rotated −60°.

According to one aspect of the invention, a waveguide switch includes a housing having a pair of ends and an interconnecting sidewall enclosing a cylindrical cavity. One of the housing ends includes an entry port and the sidewall includes a plurality of exit ports. A rotor is rotatably disposed within the cylindrical cavity. The rotor includes an input end having an input port aligned with the entry port and an outer surface having a plurality of output ports. The rotor further includes a first passage connecting the input port to one of the output ports, and also includes a cross-connect passage connecting a pair of the output ports. A motor is provided for rotating the rotor within the cavity to align each of the output ports with an adjacent one of the exit ports, thereby connecting the first passage to a selected one of the exit ports and further connecting the cross-connect passage between a pair of the remaining exit ports.

The housing exit ports preferably are equally spaced circumferentially about the outer surface of the housing sidewall, while the rotor output ports are likewise spaced circumferentially equally about the rotor outer surface. The motor is mounted to the housing at a second end of the housing, opposite the end having the entry port. The housing exit ports and the rotor output ports are located at a common cross-sectional plane, so that each of the output ports can be aligned with a selected one of the housing exit ports.

Preferably, a transformer section, which serves to offset adverse impedance changes due to the partially rotated waveguide interface, is provided at the entry point. The transformer section may be located at the housing entry port, the rotor input port, or at both locations. The transformer section preferably includes a pair of inwardly projecting ridges, with each ridge sloping at an angle relative to the transformer section sidewall. For example, the sloping ridges may be at a 60° angle. Inductive iris windows may be provided to improve response.

Preferably, tightly gapped choke joints are provided in order to reduce wave leakage around the interface between the rotor and the housing. An annular choke joint around the rotor entry port is preferred, as are a series of choke joints spaced circumferentially about the interface between the rotor and the housing.

With the motor mounted to the housing at a point offset from a central axis of the housing a second entry port is possible. A second input port in the rotor aligns with the second entry port, and a second passage in the rotor provides for the connection of the second input port with a selected one of the output ports. Also possible is a second cross-connect passage interconnecting a second pair of the output ports.

According to another aspect of the invention, a switch for a waveguide system includes a housing having a pair of ends and an interconnecting sidewall enclosing a cylindrical cavity. One of the housing ends including an entry port, and the sidewall includes a plurality of exit ports. A rotor is disposed within the housing cylindrical cavity, and includes an end having an input port generally aligned with the housing entry port, and also includes a cylindrical outer surface having three output ports. The rotor defines a primary passage between the input port and one of the output ports, and further defines a cross-connect passage between a pair of the remaining output ports. A motor rotates the rotor within the cavity to thereby align the primary passage with a selected one of the exit ports and to further align the cross-connect passage with a pair of the remaining exit ports.

In accordance with yet another aspect of the invention, a waveguide switch for guiding an electrical field comprises a housing having a pair of ends and an interconnecting sidewall enclosing a cylindrical cavity. The housing includes a plurality of waveguide ports. One of the waveguide ports is disposed adjacent one of the housing ends, while the remaining waveguide ports are spaced equally about the housing sidewall. A rotor is disposed within the housing cylindrical cavity, and includes a pair of ends and an interconnecting outer surface having a plurality of input ports. One of the input ports is located at one end of the rotor, while the remaining input ports are spaced equally about the rotor outer surface. The rotor end input port is generally aligned with the housing end waveguide port, and a motor rotates the rotor within the cavity. A primary waveguide passage is defined between the housing end waveguide port and a selected one of the remaining housing waveguide ports, and a secondary cross-connect waveguide passage is defined between a pair of the remaining housing waveguide ports.

In accordance with yet another aspect of the invention, a switch for a waveguide communication system includes a housing having a pair of ends and an interconnecting sidewall enclosing a cylindrical cavity, with each of the housing ends including an entry port. The sidewall includes a plurality of exit ports. A rotor is rotatably disposed within the cylindrical cavity and includes a pair of ends and an interconnecting outer surface. Each end of the rotor has an input port aligned with an adjacent one of the housing entry ports, and the outer surface includes a plurality of output ports. The rotor also includes a plurality of passages extending therethrough for connecting each of the input ports to an output port, and the rotor further includes a pair of cross-connect passages, each cross-connect passage being adapted to interconnect a pair of the output ports. A motor is provided at a point offset from the housing centerline for rotating the rotor in predetermined increments, thereby aligning each of the rotor output ports with a selected one of the housing exit ports.

The aforementioned features and advantages, in addition to other features and advantages, will become readily apparent to those skilled in the art upon a reading of the following detailed description.

DETAILED DESCRIPTION OF THE INVENTION

The embodiments described below are illustrative of the present invention, and are not intended to limit the scope of the invention to the precise forms disclosed. The embodiments chosen for description herein are intended to best explain the principles of the invention so that others may follow its teachings.

Figure 1:
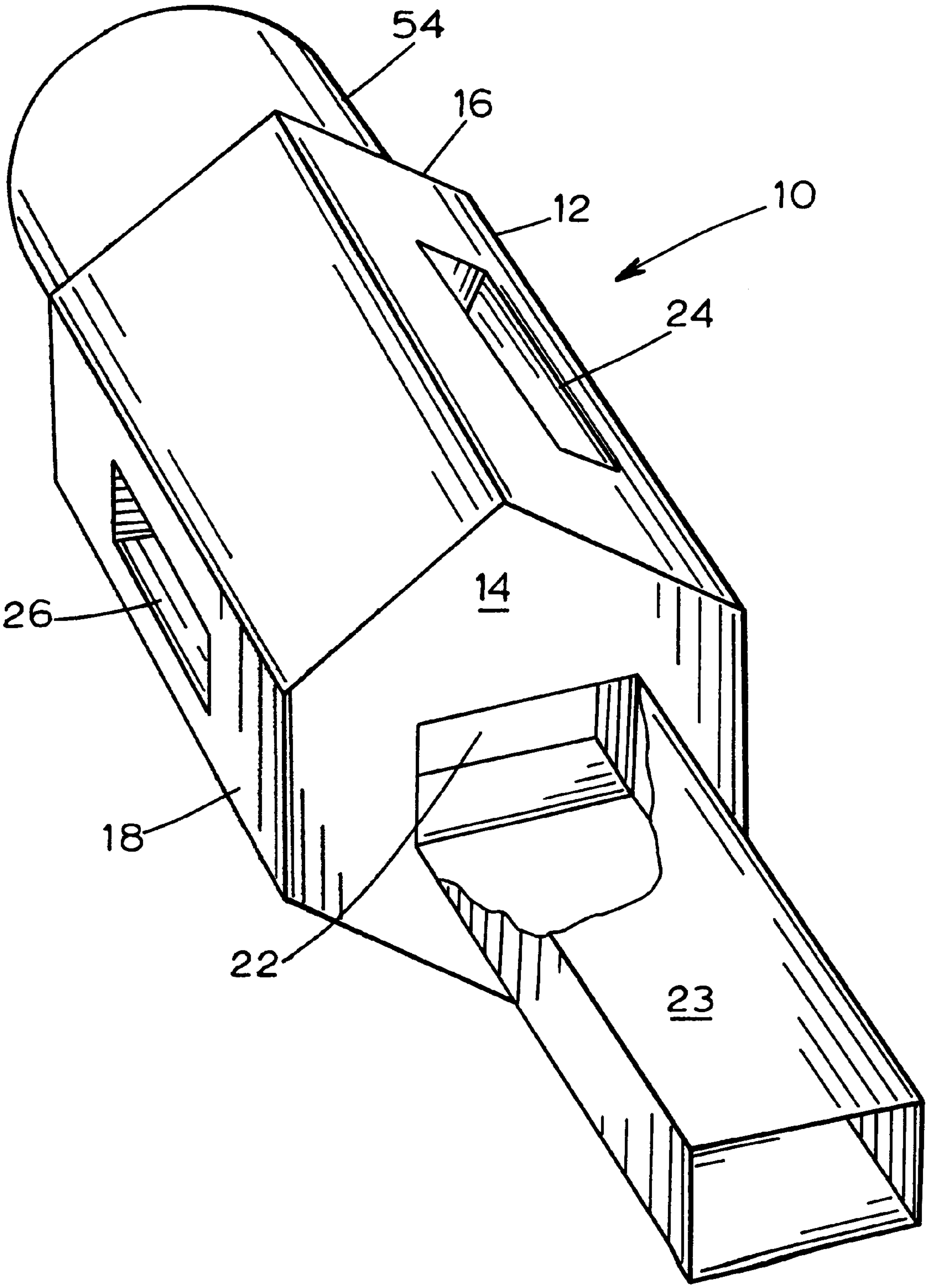
FIG. 1 is a perspective view of a compact waveguide "T" switch incorporating the features of the present invention.
Figure 2:
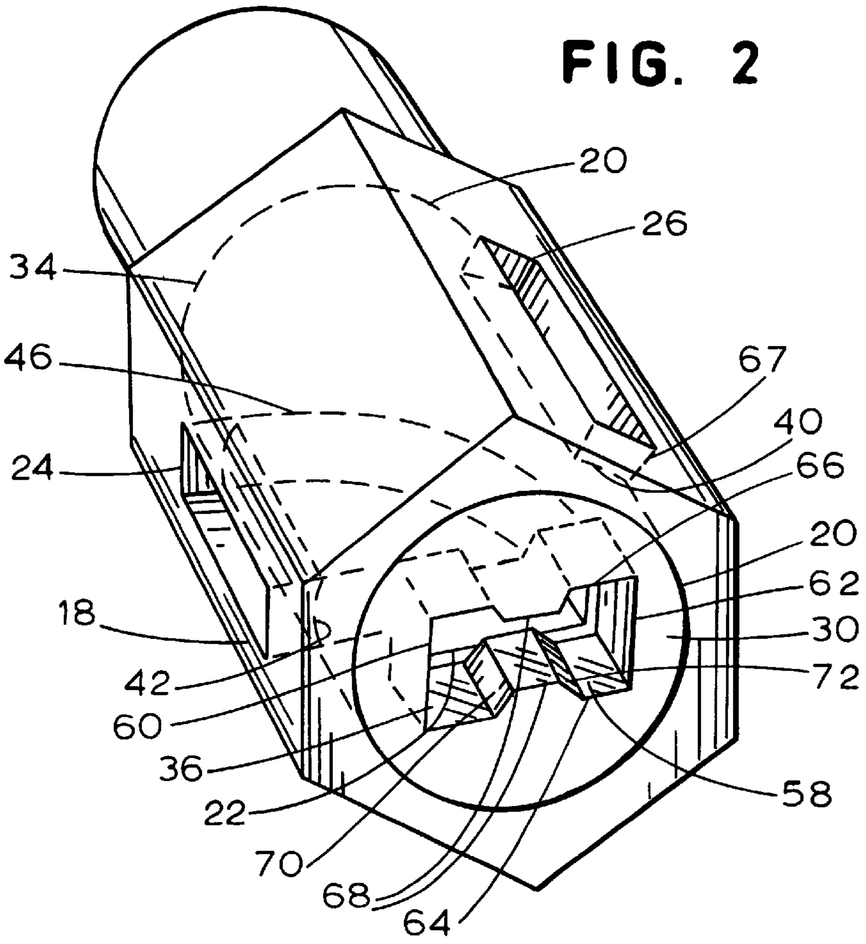
FIG. 2 is a fragmentary view in perspective similar to FIG. 1 but with the end wall cut away to reveal the rotor and the double ridge transformer.
Figure 3:
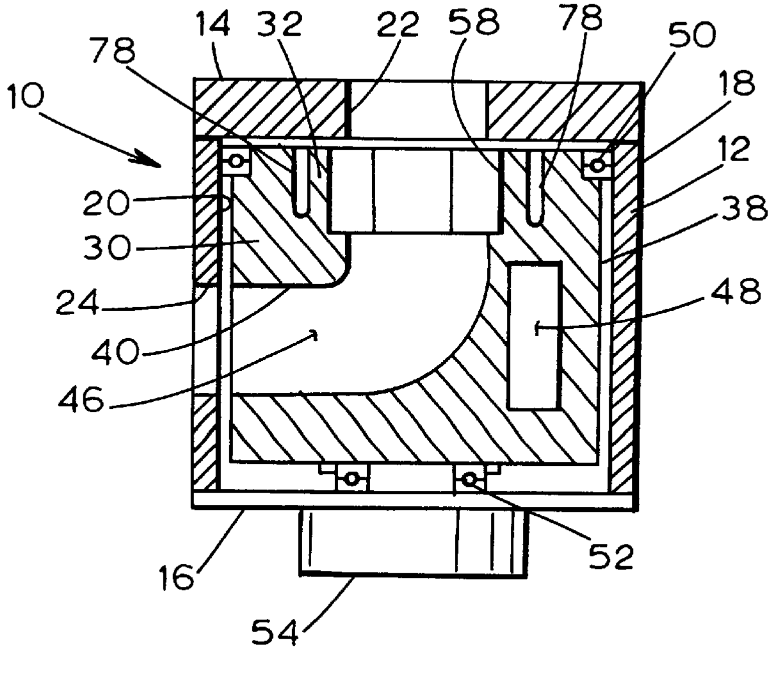
FIG. 3 is a cross-sectional view taken along line 3—3 of FIG. 1.
Figure 4:
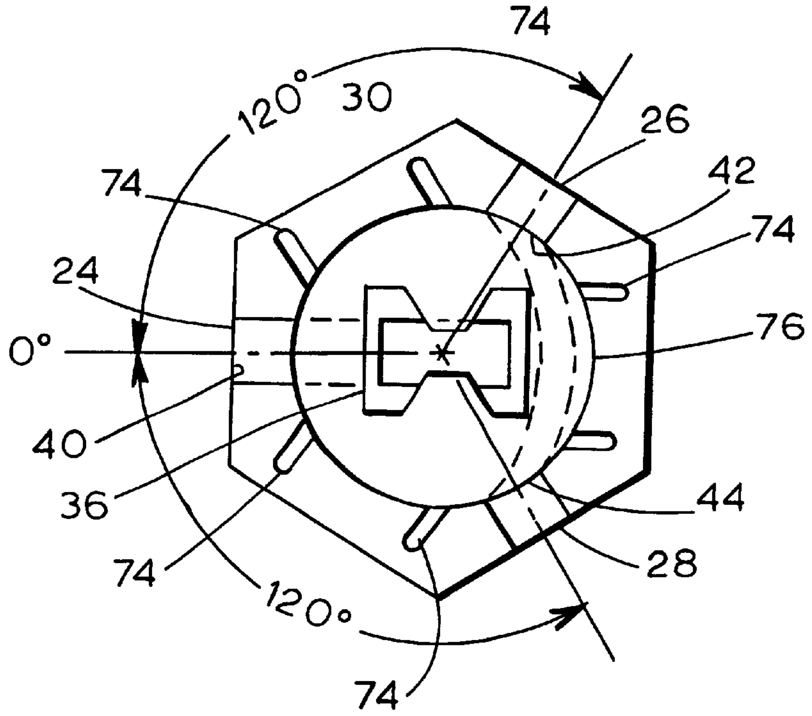
FIG. 4 is an end view in cross-section taken along line 4—4 of FIG. 2 and illustrating one of three different orientations of the rotor relative to the housing.

Referring now to the drawings, FIGS. 1 through 4 illustrate a compact waveguide "T" switch incorporating the features of the present invention and which is generally referred by the reference numeral 10. Switch 10 includes a housing 12 having a pair of end walls 14, 16, and a sidewall 18 generally extending between the end walls 14 and 16. As shown in FIG. 2, sidewall 18 preferably has a hexagonal cross-section, although other shapes are possible. A cylindrical cavity 20 is defined within the housing and is surrounded by sidewall 18 and end walls 14, 16. End wall 14 includes an entry port 22, while sidewall 18 includes a series of exit ports 24, 26 and 28. As can be seen in FIG. 4, each of the exit ports 24, 26, 28 generally lies in a common cross-sectional plane taken through the housing 12. Further, the exit ports 22, 24, 26 are spaced approximately equally about the outer perimeter of sidewall 18 in increments of approximately 120°. Preferably, the shape of the entry port 22 is rectangular to match the cross-sectional shape of a conventional rectangular waveguide 23, which is shown fragmentarily in FIG. 1. Similarly, each of the exit ports 24, 26, 28 is preferably of rectangular shape in order to match the dimensions of additional conventional waveguide components (not shown) attached thereto.

As shown to advantage in FIG. 2 through FIG. 4, a cylindrical switch body or rotor 30 is disposed within the cylindrical cavity 20 of sidewall 18. The rotor 30 includes a pair of ends 32, 34. End 32 includes an input port 36 which is generally aligned with the entry port 22 of housing 12. Rotor 30 also includes an outer surface 38 having a plurality of output ports 40, 42 and 44. As can be seen in FIGS. 3 or 4, each of the output ports 40, 42, 44 generally lies in the same cross-sectional plane as the exit ports 24, 26 and 28 of housing 12. As with the exit ports 24, 26, 28 discussed above, the output ports are spaced approximately equally about the outer perimeter of rotor 30 in increments of approximately 120°. A first passage 46 extends through the rotor 30 to connect the input port 36 with output port 40. A cross-connect passage 48 extends transversely through or across rotor 30 and connects output ports 42 and 44 with each other. The passages 46, 48, as well as the ports 36, 40, 42, 44 are all preferably of rectangular cross-sectional dimensions in order to roughly match the dimensions of a conventional waveguide system (not shown).

Rotor 30 is preferably supported on a pair of bearing assemblies 50, 52 for smooth rotation within the cavity 20 of housing 12. A motor 54 is attached adjacent the end 16 of housing 12 and includes a drive shaft or gear assembly (not shown) of the type commonly employed in waveguide switching systems. By virtue of the gear assembly, motor 54 is adapted to rotate the rotor 30 within the cylindrical cavity 20 of housing 12. As shown in FIG. 4, motor 54 preferably is adapted to rotate the rotor 30 in increments of, for example, approximately 120°, so that each of the output ports 40, 42, 44 may be aligned with a selected adjacent one of the exit ports 24, 26, 28 of the housing 12. Consequently, the first passage 46 can be used to interconnect the entry port 22 with a selected one of the exit ports 24, 26, 28, depending on the orientation of rotor 30 within the cylindrical cavity 20 of the housing 12. At the same time, the cross-connect passage 48 can be used to interconnect two of the remaining exit ports. For example, with the rotor 30 oriented substantially as shown in FIG. 2, the first passage interconnects the entry port 22 with the exit port 24, while the cross-connect passage 48 interconnects the exit ports 26 and 28.

A transformer section 58 is located adjacent the input end 32 of the rotor 30. The transformer section 58 includes a pair of end walls 60, 62, and a pair of interconnecting sidewalls 64, 66. Each of the sidewalls 64, 66 includes a ridge 68, with each ridge 68 having a pair of sloping portions 70, 72. Each sloping portion 70, 72 preferably projects from its adjacent sidewall 64, 66 at an angle of approximately 60°. Preferably, an inductive iris window 67 may be disposed adjacent the entry port 22 or one or more of the exit ports 22, 24, 26 in order to improve response. The transformer 58 allows the entry port 22 to be rotationally clocked or moved up to 60° from the standard waveguide alignment.

Figure 6:
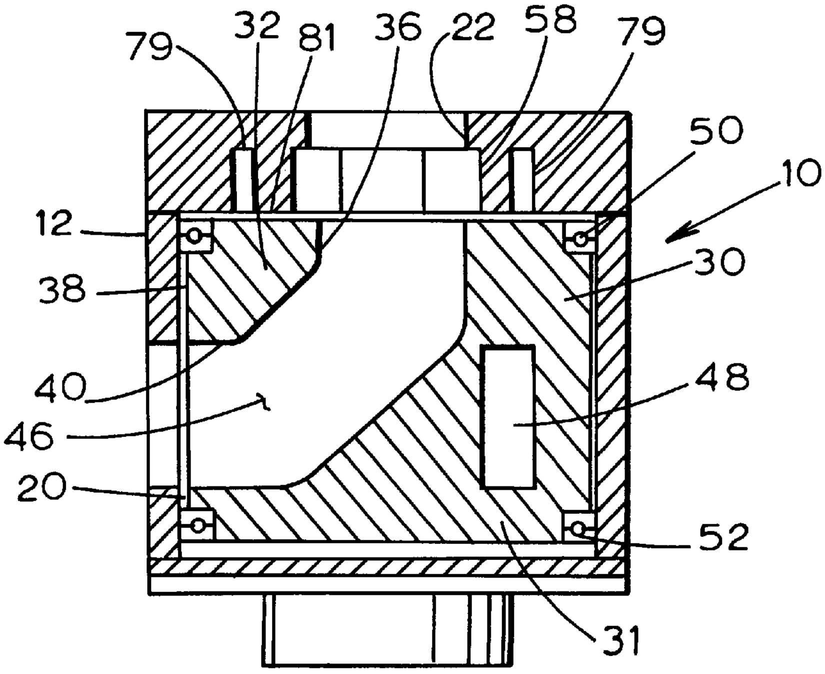
FIG. 6 is a cross-sectional view, similar to that shown in FIG. 3, but having the double ridge transformer section located adjacent the housing end wall.

Alternatively, as shown in FIG. 6, the transformer section 58 may be located adjacent the entry port 22 of housing 12, rather then adjacent the input end 32 of rotor 30. The embodiment of FIG. 7, discussed in greater detail below, shows a still further alternative, in which a transformer section **158*a* is located adjacent the entry port 122 of housing 112, while a second transformer section 158*b* is located adjacent the input end 132 of rotor 130. Each of the transformer sections 158*a* and 158*b* are in all respects identical to the transformer section 158 described above. However, by virtue of its integral construction with the rotor 130, the transformer section 158*b* is rotatable relative to transformer section 158*a*, which remains stationary within the end wall 114 of the housing 112**.

As shown in FIG. 4, a plurality of choke joints 74 are positioned circumferentially along an interface 76 between the rotor 30 and the housing 12. Although the fit between the rotor 30 and the housing 12 is preferably tightly controlled, the choke joints 74 serve to minimize radio frequency leakage along the interface 76. As shown in FIG. 3, an additional choke joint 78 is provided in the rotor 30 adjacent the input port 36, and is oriented so as to circumferentially surround the input port 36 of rotor 30. Alternatively, a choke joint 79 may be provided as shown in FIG. 6 on an inner surface 81 of the end wall 12.

Figure 5:
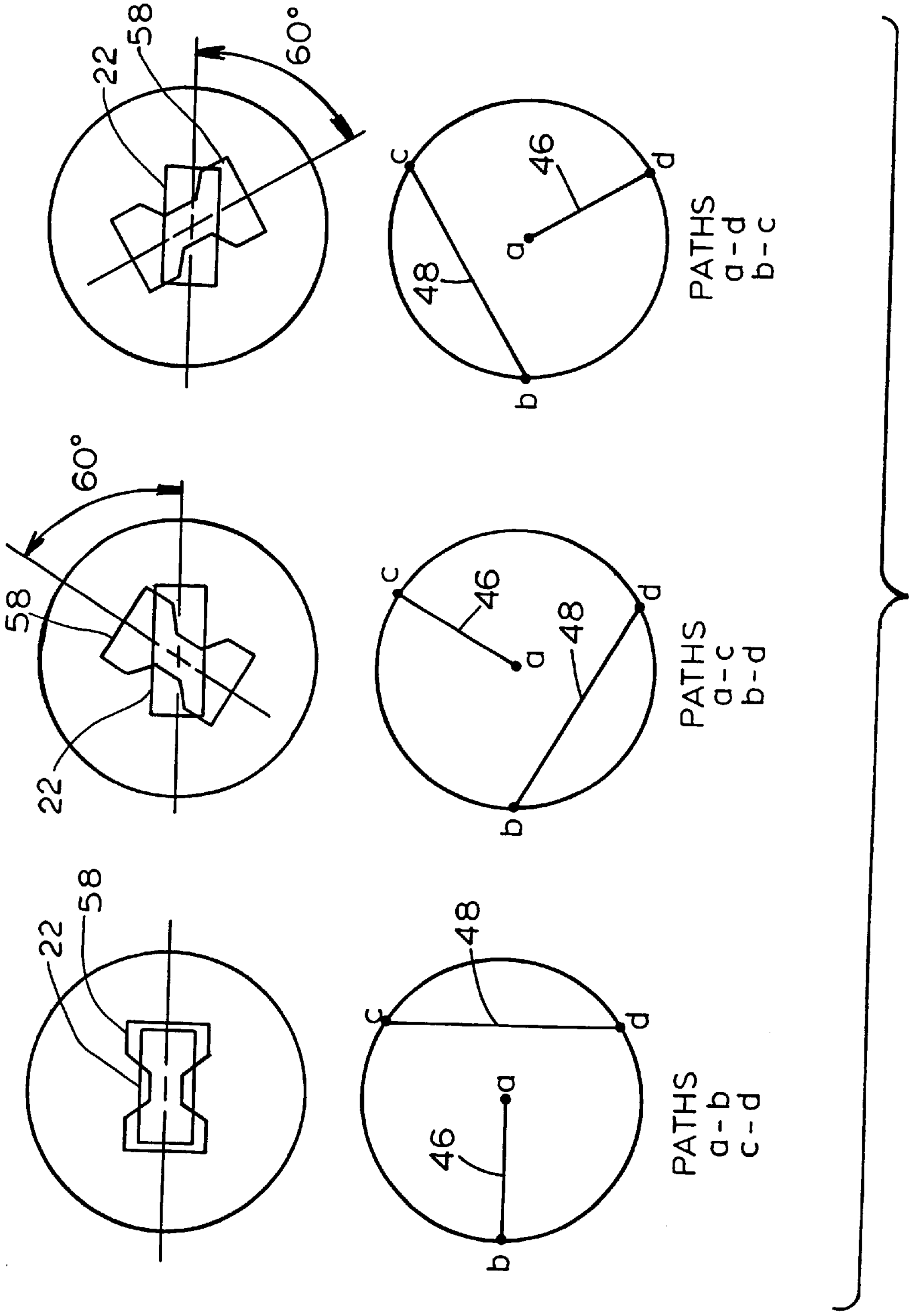
FIG. 5 includes a diagrammatic view along the bottom row of the three connecting states achievable using the embodiment of FIGS. 1—4, and shows along the top row the angular location of the rotor relative to a reference plane corresponding to each of the three connecting states.

FIG. 5 schematically illustrates the three possible connecting states achievable by rotating the rotor 30 to any one of the three selected positions. For the sake of convenience, the housing entry port 22 has been re-labeled as port A, while the housing exit ports 24, 26 and 28 have been re-labeled as ports B, C and D, respectively. As shown in the first diagrammatic view of FIG. 5 (with the rotor 30 oriented at 0° relative to the housing 12, which would correspond to the configuration illustrated in FIG. 2 and FIG. 4), port A is connected with port B along the first passage 46, while ports C and D are interconnected by the cross-connect passage 48. Upon rotation of the rotor 30 in the preferred increment of 120° in the clockwise direction, the connecting state changes to that shown in the middle diagram of FIG. 5. In the second connecting state, the first passage 46 now connects ports A and C, while the cross-connect passage 48 now connects ports B and D. Finally, as shown to the far right of FIG. 5, upon rotation of the rotor 30 an additional 120°, passage 46 now connects ports A and D, while cross-connect passage 48 now connects ports B and C.

Figure 7:
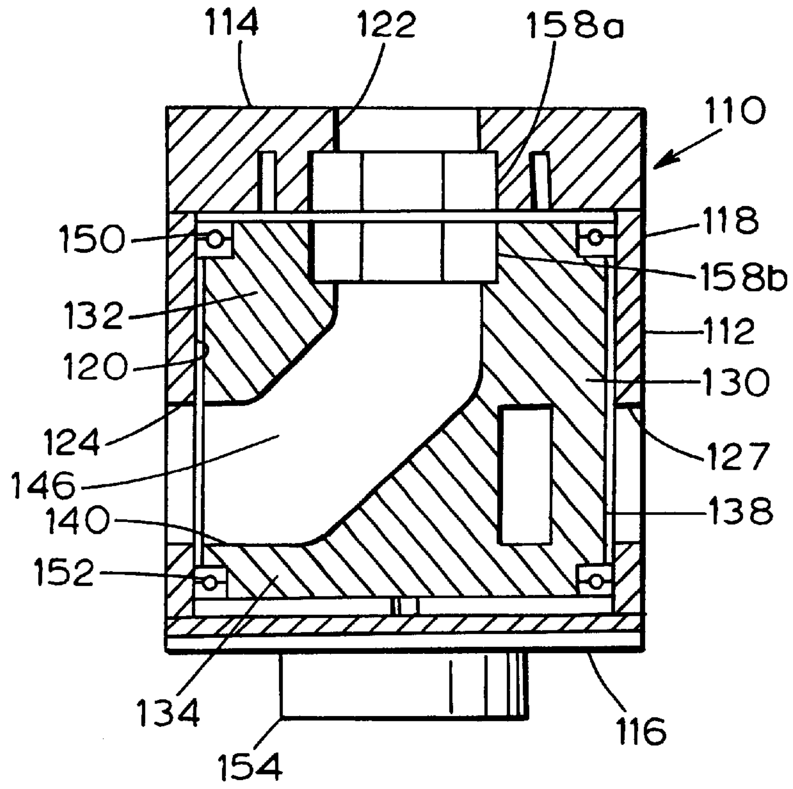
FIG. 7 is a cross-sectional view, similar to that shown in FIG. 6, but illustrating a second embodiment having a pair of double ridge transformers and having additional ports in the housing sidewall.
Figure 8:
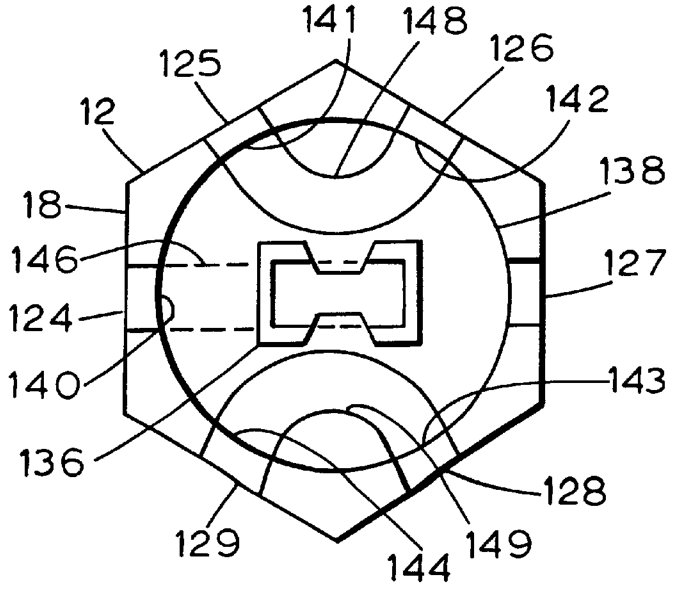
FIG. 8 is a cross-sectional view taken along line 8—8 of FIG. 7 showing the additional housing ports and an additional cross-connect waveguide path.
Figure 9:
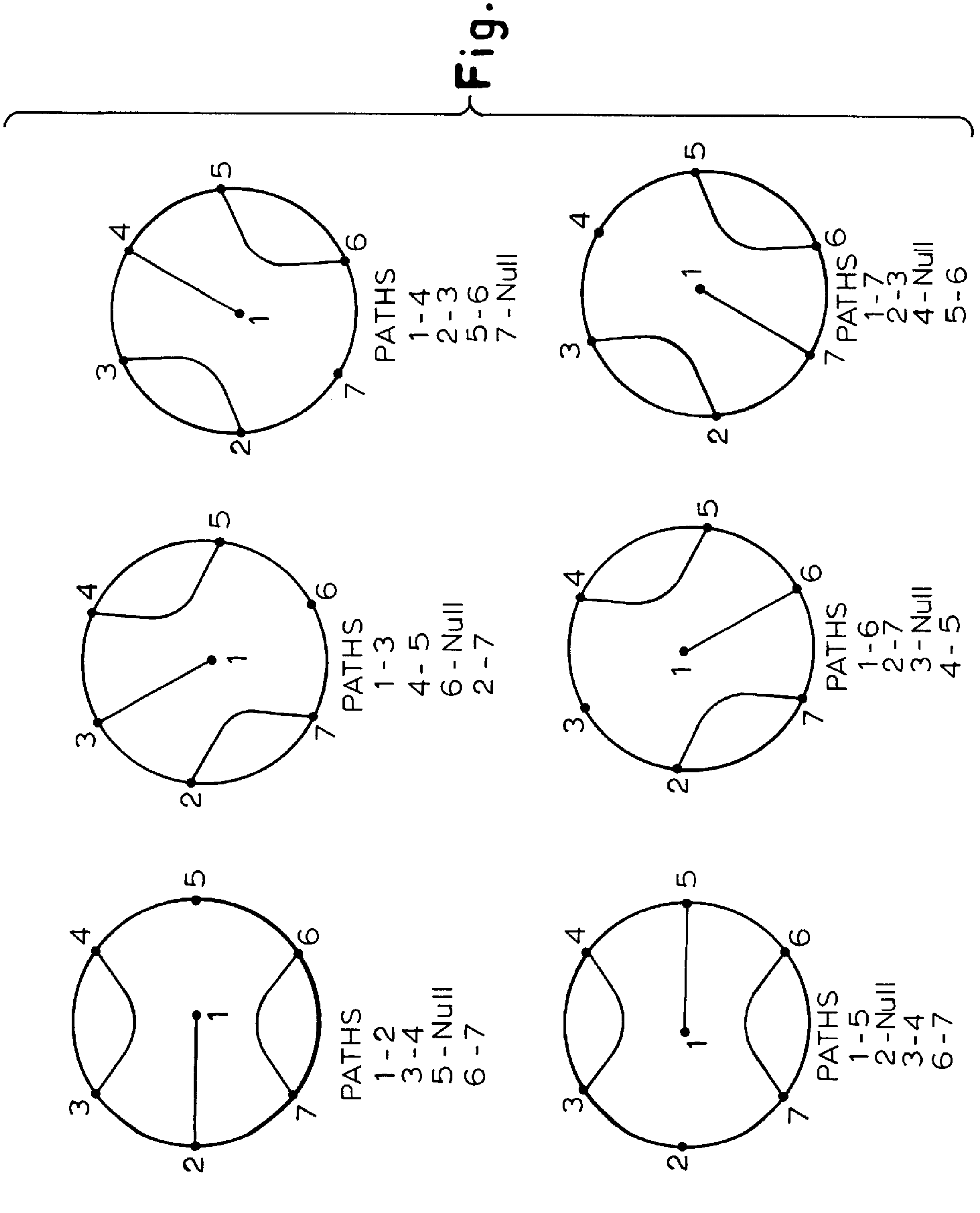
FIG. 9 is a diagrammatic view of the six connecting states achievable using the embodiment of FIGS. 7–8.

FIGS. 7 through 9 illustrate an alternate embodiment for a compact waveguide "T" switch which is generally indicated by the reference numeral 110. The reference characters for elements that are the same or similar to the elements of the embodiment shown in FIGS. 1–4 remain the same, but have been increased by 100. Switch 110 includes a housing 112 having a pair of end walls 114, 116, and a sidewall 118 generally extending between the end walls 114 and 116. As shown in FIG. 2, sidewall 118 preferably has a hexagonal cross-section, although other shapes are possible. A cylindrical cavity 120 is defined within the housing and is surrounded by sidewall 118 and end walls 114, 116. End wall 114 includes an entry port 122. Sidewall 118 includes a set of exit ports 124–129, spaced at increments of 60°. All of the exit ports 124–129 lie in the same cross-sectional plane as shown in FIG. 8. The cross-sectional shape of the ports is preferably rectangular to match the cross-sectional shape of conventional waveguide components (not shown).

A cylindrical switch body or rotor 130 is disposed within the cylindrical cavity 120 of the housing 112. The rotor 130 includes a pair of ends 132, 134. End 132 includes an input port 136 which is generally aligned with the entry port 122 of housing 112. Rotor 130 also includes an outer surface 138 having a set of output ports 140–144 spaced about the rotor in increments of approximately 60° (except for the gap between ports 142 and 143, which is approximately 120°.

A passage 146 extends through the rotor 130 to connect the input port 136 with output port 140. A cross-connect passage 148 extends transversely through or across a portion of the rotor 130 and connects output ports 141 and 142 with each other. On the other side of the rotor 130, a second cross connect passage 149 extends through or across a portion of the rotor 130 and connects ports 143 and 144 with each other. When the rotor 130 is in the position shown in FIG. 8, the passage 146 connects the input port 122 to the output port 124, the passage 148 connects the ports 125 and 126, and the passage 149 connects the ports 128 and 129.

Rotor 130 is preferably supported on a pair of bearing assemblies 150, 152 for smooth rotation within the cavity 120 of housing 112. A motor 154 is attached adjacent the end 116 of housing 112 and includes a drive shaft or gear assembly (not shown) of the type commonly employed in waveguide switching systems. By virtue of the gear assembly, motor 154 is adapted to rotate the rotor 130 within the cylindrical cavity 120 of housing 112. As shown in FIG. 8 and diagrammatically in FIG. 9 or 11, motor 154 preferably is adapted to rotate the rotor 130 in increments of, for example, approximately 60°, so that each of the output ports 140–144 may be aligned with a selected adjacent one of the exit ports 124–129 of housing 112. For example, the passage 146 can be used to interconnect the entry port 122 with any one of the exit ports 124–129. A transformer section 158 is located adjacent the input end 132 of the rotor 130. The transformer section 158 includes a pair of end walls 160, 162, and a pair of interconnecting sidewalls 164, 166. Each of the sidewalls 164, 166 includes a ridge 168, with each ridge having a pair of sloping portions 170, 172. Each sloping portion 170, 172 preferably projects from its adjacent sidewall 164, 166 at an angle of approximately 60°.

The pair of cross connect ports 148 and 149 interconnect the remaining exit ports depending on the orientation of rotor 130 within the cylindrical cavity 120 of housing 112.

For example, with the rotor 130 positioned as shown in FIG. 8, the cross-connect passage 148 connects exit ports 125 and 126, while the cross-connect passage 149 connects exit ports 128 and 129. FIG. 9 shows the possible connecting states achievable using the configuration of FIGS. 7 and 8. Each representation in FIG. 9 represents an angular change of 60°.

Figure 10:
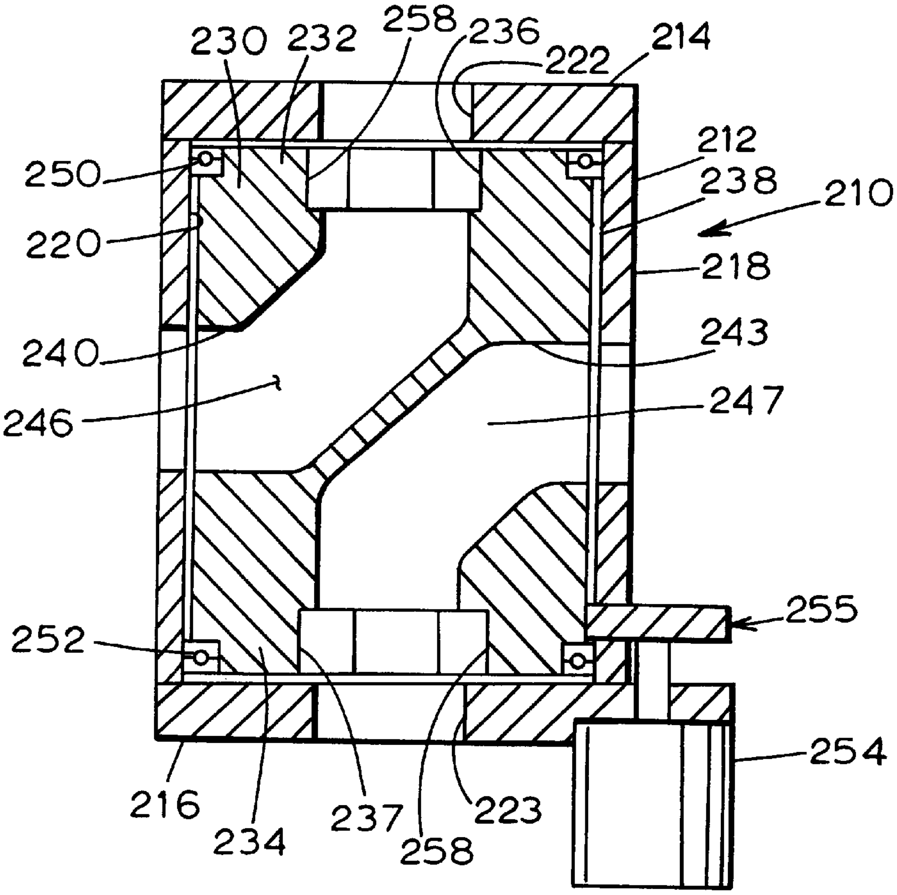
FIG. 10 is a cross-sectional view of another embodiment of the present invention, similar to the embodiment of FIGS. 1–4 but having an input port in each end of the device and an additional cross-connect path thereby increasing the number of possible connecting states to six.
Figure 11:
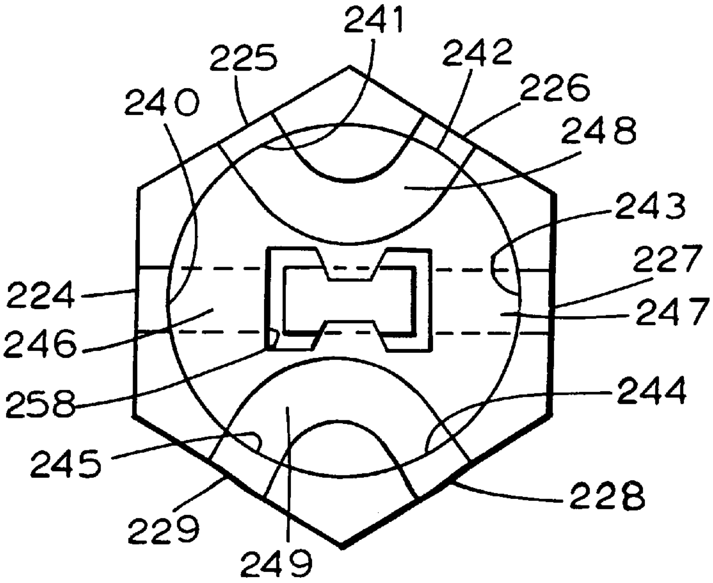
FIG. 11 is an end view of the embodiment shown in FIG. 10.
Figure 12:
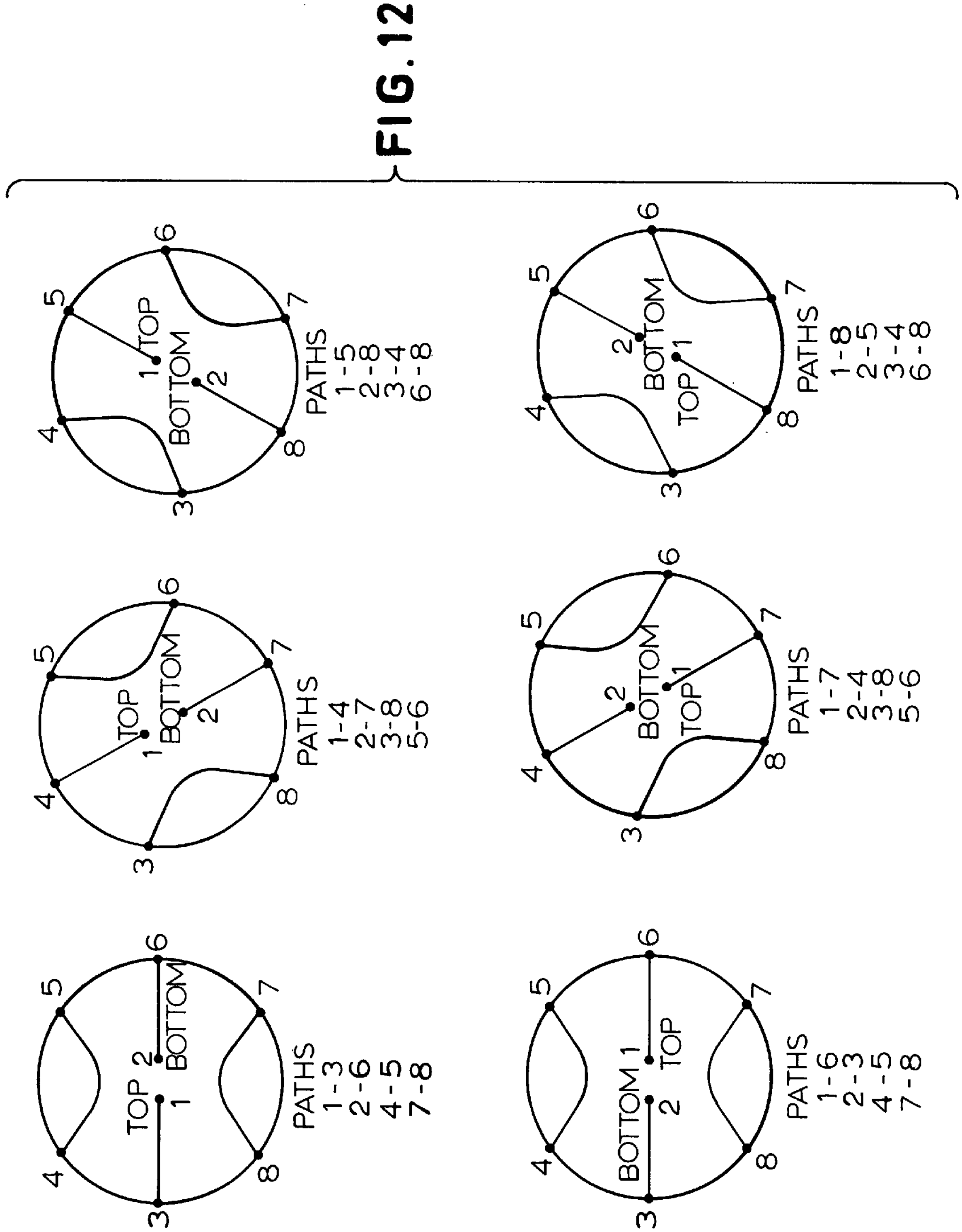
FIG. 12 is a diagrammatic view of the six connecting states achievable using the embodiment of FIGS. 10 and 11.

FIG. 10 through FIG. 12 illustrate another alternate embodiment for a compact waveguide "T" switch which is generally indicated by the reference numeral 210. The reference characters for elements that are the same or similar to the elements of the embodiment shown in FIGS. 1–4 remain the same, but have been increased by 200. Switch 210 includes a housing 212 having a pair of end walls 214, 216, and a sidewall 218 generally extending between the end walls 214 and 216. As shown in FIG. 11, sidewall 218 preferably has a hexagonal cross-section, although other shapes are possible. A cylindrical cavity 220 is defined within the housing and is surrounded by sidewall 218 and end walls 214, 216. End wall 214 includes an entry port 222. Sidewall 218 includes a set of exit ports 224–229, spaced at increments of 60°. All of the exit ports lie in the same cross-sectional plane as shown in FIG. 11. The cross-sectional shape of the ports is preferably rectangular to match the cross-sectional shape of conventional waveguide components (not shown).

A cylindrical switch body or rotor 230 is disposed within the cylindrical cavity 220 of sidewall 218. The rotor 230 includes a pair of ends 232, 234. End 232 includes an input port 236 which is generally aligned with an port 222 of housing 212, while end 234 includes an input port 237 aligned with a second entry port 223 in end wall 216 of the housing 212. The sidewall 218 of the housing 212 includes a set of exit ports 224–229, spaced at intervals of approximately 60° about the sidewall 218. The rotor 230 includes an outer surface 238 having a set of output ports 240–245, also spaced at intervals of approximately 60°.

A first passage 246 extends through the rotor 230 to connect the input port 236 with output port 240, while a second passage 247 connects the input port 237 to the output port 243. A cross-connect passage 248 extends transversely through or across rotor 230 and connects output ports 241 and 242 with each other. A second cross connect passage 249 extends through rotor 230 and connects ports 244 and 245.

The rotor 230 is preferably supported on a pair of bearing assemblies 250, 252 for smooth rotation within the cavity 220 of housing 212. A motor 254 is attached adjacent the end 216 of housing 212, and includes an offset drive assembly 255. The motor 254 is adapted to rotate the rotor 230 within the cylindrical cavity 220 in increments of approximately 60°. A transformer section 258 is located adjacent the input ends 236 and 237 of the rotor 230.

The pair of cross connect ports 248 and 249 interconnect the remaining exit ports depending on the orientation of rotor 230 within the cylindrical cavity 220 of housing 212. For example, with the rotor 230 positioned as shown in FIG. 11, the cross-connect passage 248 connects exit ports 225 and 226, while the cross-connect passage 249 connects exit ports 228 and 229.

FIG. 12 illustrates the six possible connecting states achievable using the embodiment of FIG. 10 and FIG. 11. For the sake of convenience, the housing ports 222 and 223 have been re-labeled as ports 1 and 2, while the ports 224–229 have been re-labeled as ports 3 through 9. The connecting states can be observed by proceeding through the diagrammatic views of FIG. 12, with each view representing a 60° incremental change in the position of the rotor 230 from the preceding view.

Figure 13:
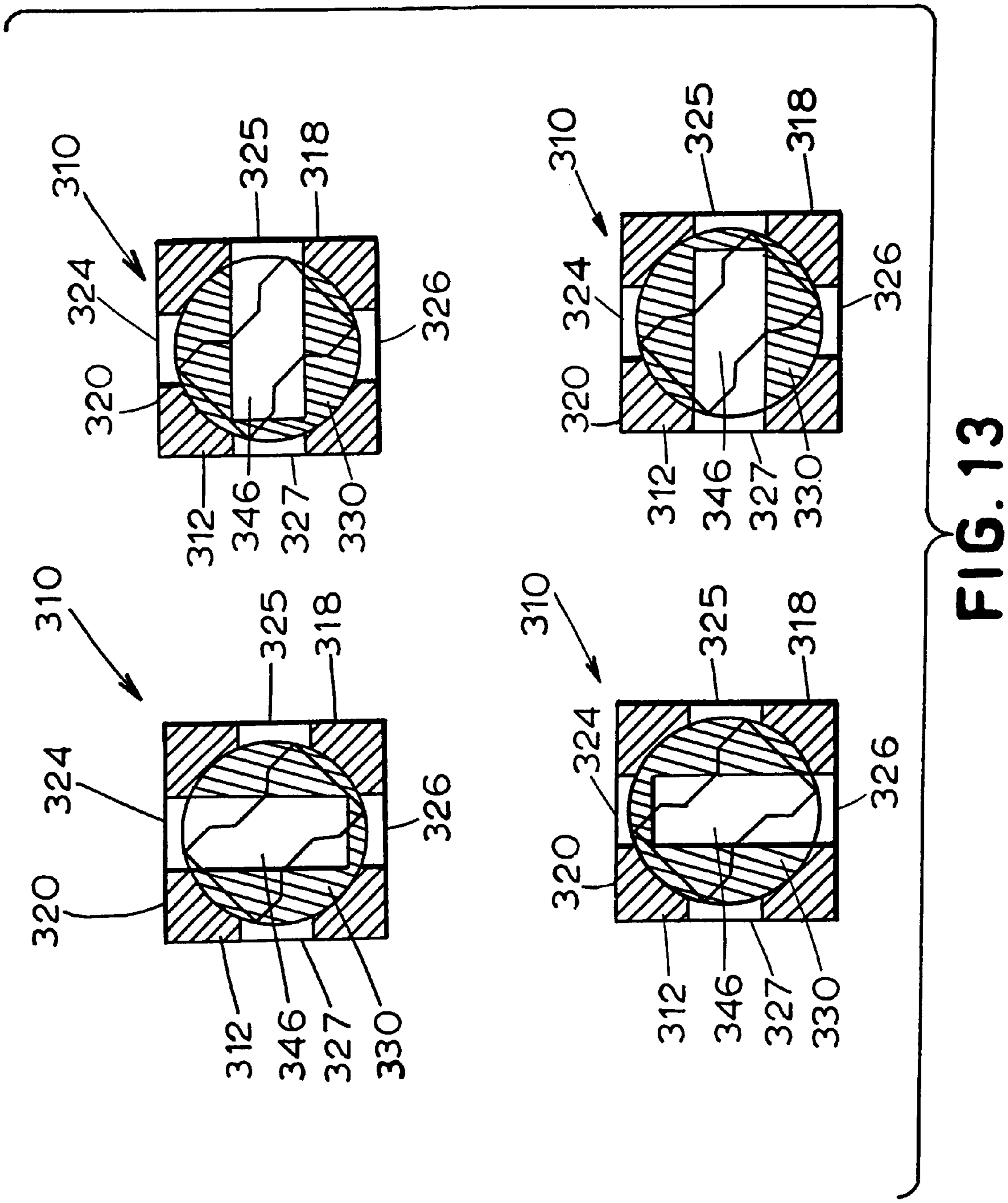
FIG. 13 is an end view in cross-section of a simplified 1:4 "T" switch having no cross-connect ports.

FIG. 13 illustrates another alternate embodiment for a compact waveguide 1:4 switch which is generally indicated by the reference numeral 310. Whereas a "T" switch as discussed above may be viewed as a 1:3 switch with the addition of a cross-connect port, the 1:4 configuration of FIG. 14 adds a fourth port and dispenses with the cross-connect passage. To the extent possible, elements that are the same or similar to the elements of the embodiment shown by FIGS. 1–4 described above retain the same reference characters, but have been increased by 300.

Switch 310 includes a housing 312 having a round, square, or generally rectangularly shaped sidewall 318. Housing 312 includes four exit ports 324–327. A rotor 330 is rotatably disposed within a cavity 320 of housing 312 and is adapted for incremental rotation using a conventional drive motor assembly (not shown). Upon rotation of the rotor 330 within the cavity 320, a passage 346 will be positioned for alignment between an entry port 322 and a selected one of the exit ports 324–327. Preferably, a transformer (not shown) is added at the entry of port 322, which transformer is fixed at a 450 orientation. As such, the waveguides can be oriented, upon rotation of the rotor 330, while maintaining good VSWR. As shown, the rotor 330 can be rotated 45°, 135°, 225° and 315°.

Figure 14:
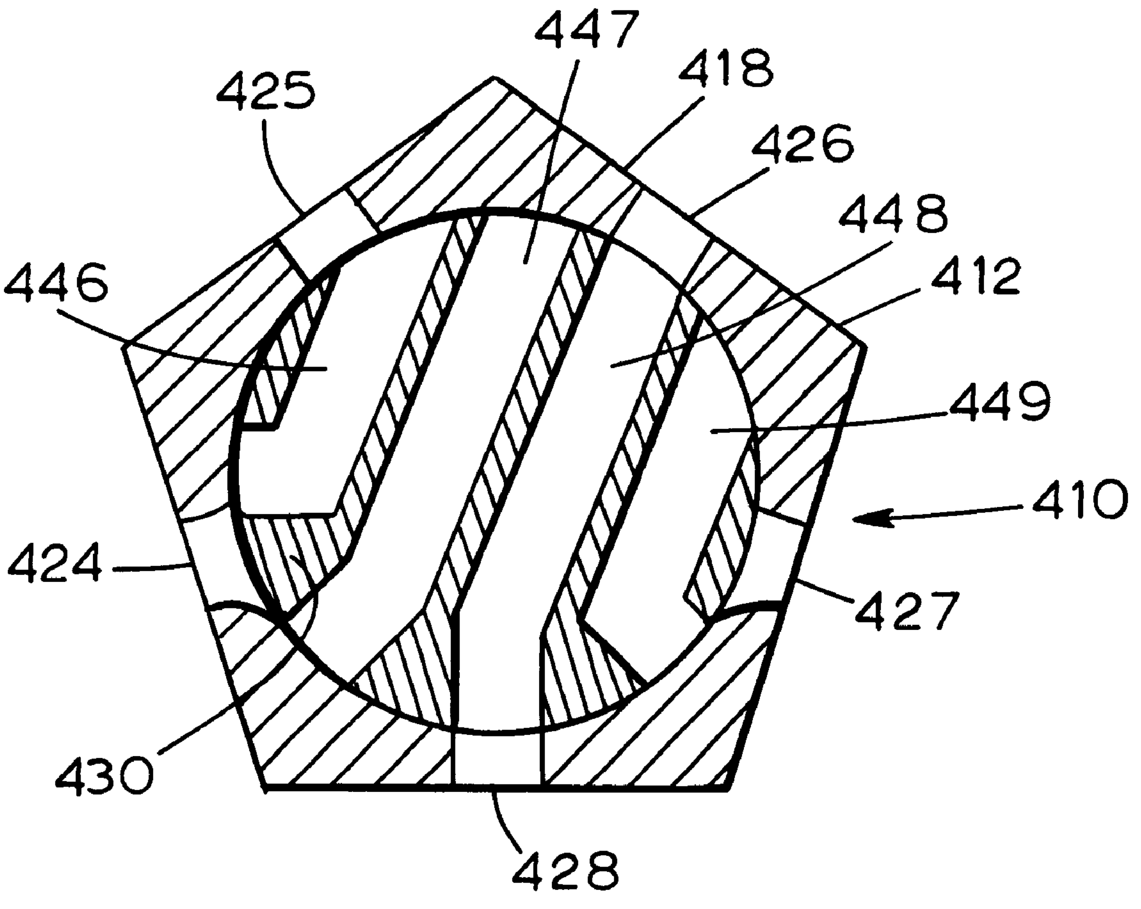
FIG. 14 is an end view in cross-section of a "T" switch having a five-sided housing and a rotor having four paths.

Finally, FIG. 14 illustrates another alternative 1:4 switch configuration. The principles are the same as described in the embodiment of FIG. 13, but the dimensional properties of the housing and the passages have been altered as shown. A switch is generally indicated by the reference numeral 410. Switch 410 includes a housing 412 having a pentagonally shaped sidewall 418, which includes five exit ports 424–428. A rotor 430 is rotatably disposed within a cavity 420 of housing 412 and is adapted for incremental rotational displacement using a conventional motor drive assembly (not shown). Rotor 430 includes four passages 446–449, so that upon rotation of the rotor 430 at least one of the passages will interconnect a chosen pair of the five exit ports 424–428.

It will be understood that the above description does not limit the invention to the above-given details. It is contemplated that various modifications and substitutions can be made without departing from the spirit and scope of the following claims.

What is claimed:

1. A waveguide switch, comprising:

a housing, the housing having a pair of ends and an interconnecting sidewall enclosing a cylindrical cavity, one of the housing ends including an entry port, the sidewall including a plurality of exit ports;

a rotor rotatably disposed within the cylindrical cavity, the rotor including an input end having an input port aligned with the entry port and an outer surface having a plurality of output ports, the rotor further including a first passage connecting the input port to one of the output ports and further including a cross-connect passage connecting a pair of the output ports; and a motor for rotating the rotor within the cavity for aligning each of the output ports with an adjacent one of the exit ports, thereby connecting the first passage to a selected one of the exit ports and further connecting the cross-connect passage between a pair of the remaining exit ports.

2. The device of claim 1, wherein the housing exit ports are equally spaced circumferentially about an outer surface of the housing sidewall.

3. The device of claim 2, wherein the motor is mounted to the housing at a second end opposite the one housing end.

4. The device of claim 2, wherein the rotor output ports are equally spaced circumferentially about the rotor outer surface.

5. The device of claim 1, wherein the housing exit ports are located at a common cross-sectional plane taken through the housing.

6. The device of claim 1, wherein the rotor output ports are located at a common cross-sectional plane taken through the rotor.

7. The device of claim 1, wherein the rotor input end includes a transformer section.

8. The device of claim 7, wherein the transformer section includes a pair of end walls and a pair of interconnecting sidewalls.

9. The device of claim 8, wherein each of the transformer section sidewalls includes a ridge.

10. The device of claim 9, wherein each of the ridges projects from its adjacent transformer section sidewall at an angle of 60 degrees.

11. The device of claim 1, wherein the housing end port includes a transformer section.

12. The device of claim 11, wherein the transformer section includes a pair of end walls and a pair of interconnecting sidewalls, each of the transformer section sidewalls including a ridge projecting at an angle of 60 degrees.

13. The device of claim 1, wherein the housing end port and the rotor input port each include a double ridged transformer section.

14. The device of claim 1, including choke joints along an interface between the rotor and the housing.

15. The device of claim 1, including an annular choke joint surrounding the rotor entry port.

16. The device of claim 7, including an inductive iris windows disposed adjacent the transformer section.

17. The device of claim 11 including an inductive iris windows disposed adjacent the transformer section.

18. The waveguide of claim 1, wherein the motor is mounted to the housing at a point offset from a central axis of the housing, and further wherein the housing includes a second entry port opposite the first mentioned entry port, and the rotor includes a second input port opposite the first input port and aligned with the housing second entry port, the rotor further including a second passage interconnecting the second input port to one of the output ports.

19. The waveguide of claim 18, including a second cross-connect passage interconnecting a second pair of the output ports.

20. A waveguide for guiding an electrical field, comprising:

a housing, the housing having a pair of ends and an interconnecting sidewall enclosing a cylindrical cavity, one of the housing ends including an entry port, the sidewall including a plurality of exit ports;

a rotor disposed within the housing cylindrical cavity, the rotor including an end having an input port generally aligned with the housing entry port and a cylindrical outer surface having three output ports, the rotor defining a primary passage between the input port and one of the output ports and further defining a secondary passage between a pair of the remaining output ports;

a motor for rotating the rotor within the cavity thereby aligning the primary passage with a selected one of the exit ports and further aligning the secondary passage with a pair of the remaining exit ports.

21. The device of claim 20, wherein the housing exit ports are equally spaced circumferentially about an outer surface of the housing sidewall.

22. The device of claim 21, wherein the sidewall outer surface is hexagonal.

23. The device of claim 21, wherein the rotor output ports are equally spaced circumferentially about the rotor outer surface.

24. The device of claim 22, wherein the housing exit ports are located at a common cross-sectional plane taken through the housing.

25. The device of claim 22, wherein the rotor output ports are located at a common cross-sectional plane taken through the rotor.

26. The device of claim 22, wherein the rotor input end includes a transformer section.

27. The device of claim 26, wherein the transformer section includes a pair of end walls and a pair of interconnecting sidewalls.

28. The device of claim 27, wherein each of the transformer section sidewalls includes a ridge.

29. The device of claim 28, wherein each of the ridges projects from its adjacent transformer section sidewall at an angle of 60 degrees.

30. The device of claim 22, wherein the housing end port includes a transformer section.

31. The device of claim 30, wherein the transformer section includes a pair of end walls and a pair of interconnecting sidewalls, each of the transformer section sidewalls including a ridge projecting at an angle of 60 degrees.

32. The device of claim 22, wherein the housing end port and the rotor input port each include a double ridged transformer section.

33. The device of claim 22, including choke joints along an interface between the rotor and the housing.

34. The device of claim 26, including an inductive iris windows disposed adjacent the transformer section.

35. The device of claim 30, including an inductive iris windows disposed adjacent the transformer section.

36. A waveguide for guiding an electrical field, comprising:

a housing having a pair of ends and an interconnecting sidewall enclosing a cylindrical cavity, the housing including a plurality of waveguide ports, an end one of the waveguide ports being disposed adjacent one of the housing ends, the remaining waveguide ports being spaced equally about the housing sidewall;

a rotor disposed within the housing cylindrical cavity, the rotor including a pair of ends and an interconnecting outer surface, the rotor further including a plurality of input ports, an end one of the input ports being disposed adjacent one of the rotor ends, the remaining input ports being spaced equally about the rotor outer surface, the rotor end input port being generally aligned with the housing end waveguide port;

a motor for rotating the rotor within the cavity;

the rotor and housing thereby defining a primary waveguide passage between the housing end waveguide port and a selected one of the remaining housing waveguide ports, and further defining a secondary cross-connect waveguide passage between at least a pair of the remaining housing waveguide ports.

37. A switch for a waveguide communication system, comprising:

a housing having a pair of ends and an interconnecting sidewall enclosing a cylindrical cavity, each of the housing ends including an entry port, the sidewall including a plurality of exit ports;

a rotor rotatably disposed within the cylindrical cavity and having a pair of ends and an interconnecting outer surface, each end having an input port aligned with an adjacent one of the housing entry ports, the outer surface including a plurality of output ports, the rotor including a plurality of passages extending therethrough for connecting each of the input ports to an output port, the rotor further including a pair of cross-connect passages, each cross-connect passage for interconnecting a pair of the output ports; and a motor offset from a centerline of the housing for rotating the rotor in predetermined increments, thereby aligning each of the rotor output ports with a selected one of the housing exit ports.

* * * * *